PETER PAUL CORSI
*INVENTOR.*

Patented Nov. 20, 1951

2,575,797

UNITED STATES PATENT OFFICE 2,575,797

FISH LURE

Peter Paul Corsi, North Arlington, N. J.

Application January 6, 1950, Serial No. 137,095

3 Claims. (Cl. 43—42.39)

1

This invention relates generally to a fish lure and more particularly to a fish lure of the floating type, streamlined and balanced for the casting type of fishing so that it will assume an upright position when cast into the water.

It is well known that there are various type of fishing lures of the floating and non-floating variety which are utilized as bait to attract fish.

The present invention contemplates a plastic coated substantially streamlined fish lure of the floating variety, which will assume an upright position when cast into the water and which is constructed to be drawn through weeds or over lily pads without becoming entangled therewith.

Accordingly, it is an object of the present invention to provide a novel fish lure in which the body is balanced to provide means for making the fish lure assume an upright position when cast into the water.

It is another object of the present invention to provide weed deflecting members on the body which will protect the hook or hooks from becoming entangled with the weeds, eel grass or the like which abounds in shallow water into which the lure may be cast, by forcing the lure to sink slightly in response to the pressure on the weed deflecting members. However, these members will not prevent the fish from grabbing the hook.

A further object of this invention is to provide a fish lure wherein the general appearance will be substantially life-like in resemblance to frogs, mice and the like upon which larger fish feed and which attract fish especially when floating in the water or when being pulled across a lily pad.

With these and other objects in view, as may appear from the accompanying specification, the invention consists of various features of construction and combination of parts, which will be first described in connection with the accompanying drawings, showing a fish lure of a preferred form embodying the invention, and the features forming the invention will be specifically pointed out in the claims.

Figure 1:
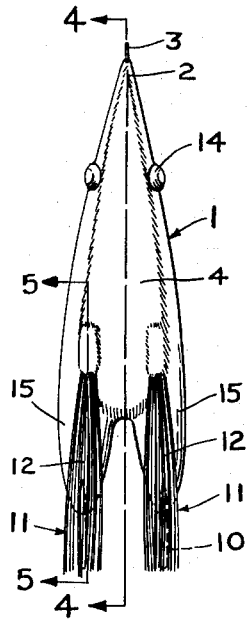
Figure 1 is a top view of a fish lure showing the invention.
Figure 2:
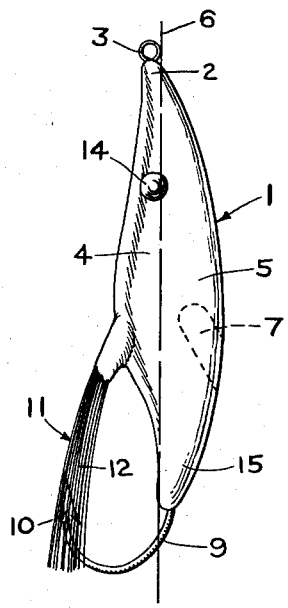
Figure 2 is a side view of a fish lure showing the invention.
Figure 3:
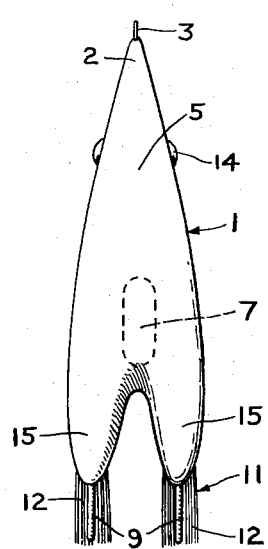
Figure 3 is a bottom view of a fish lure showing the invention.
Figure 4:
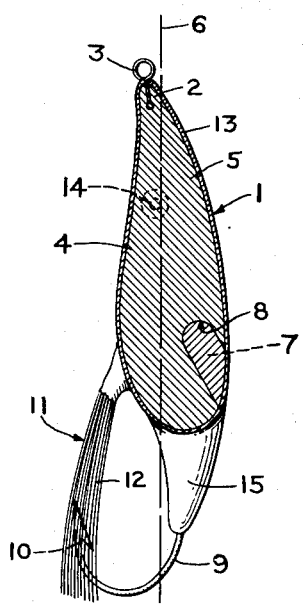
Figure 4 is a section taken along the line 4—4 of Figure 1.
Figure 5:
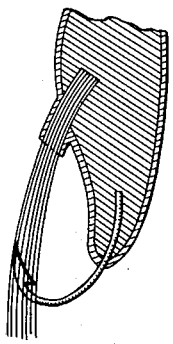
Figure 5 is a fragmentary cross-section taken on the line 5—5 of Figure 1 showing the embedding of the weed deflectors and the hook member.

Referring more particularly to the drawings, the figures show a fish lure having a body 1 made of a light buoyant material such as balsam wood or plastic wood or some combination thereof. The body is constructed to simulate the appearance of a frog, it will be understood, however, that the invention is not to be so limited.

Accordingly, the body 1 is shown substantially streamlined in appearance being pointed at the forward portion as at 2 and extending symmetrically backward in the central horizontal plane of the lure to provide lateral stability therefor and provide a pointed nose portion to facilitate drawing the lure through weeds, etc. A line attachment eye 3 is fixedly connected at the pointed nose portion 2 of the body to provide means for connecting the lure to a fishing line (not shown) so that the lure may be cast into the water and drawn therethrough.

In the vertical plane of the body, the upper portion 4 and the lower portion 5 are unsymmetrical in that the greater portion of the weight of the lure is distributed below the center line 6. Thus when the lure is placed, cast or otherwise directed into the water it will be so balanced by this distribution of weight that it will always float so that the upper portion 4 will be above the lower portion 5 and the lure will be maintained in an upright position. The assuming of this upright position will also help to give this lure a more life-like appearance when it is in the water along with the simulated exterior construction of a frog, mouse, etc.

To assist the lure in righting itself and maintaining a desired degree of submergence, a weight 7 may be provided in the latter third of the lower portion 5. The weight 7 is embedded in an opening 8 which may be drilled or gouged out of the lower portion 5 preferably from the rear portion of the body and thereafter covered by the outer coating hereinafter described so as not to interfere with the outer line of the lower portion 5.

Lower portion 5 may have a varying degree of arcuate curvature such that the line attachment means 3 will be above the lowest surface thereof to allow the lure to be pulled across a lily pad or the like.

A hook member 9 is adapted to this same arcuate curvature so as not to interfere with the line of the body formed in the lower portion 5. The hook member 9 may be any type of conventional barbed hook of which there are many types easily purchasable on the open market. It will be fixedly embedded in the body member by any suitable means to extend rearwardly and upwardly such that the barbed end 10 will be above and slightly rearwardly of the upper portion 4 of the body 1.

Cooperating with the hooks provided on the body 1 are weed deflecting members 11 which are fixedly embedded and substantially continuous with the upper portion 4 from the rearward third so as not to interfere with the streamlined line thereof.

Weed deflecting members 11 are composed of a series of strands 12 made out of plastic, horsehair or the like which extend rearwardly over and about the barbed end of the hook member 9 and conceal it. The weed deflecting member 11 formed from the strands 12 must be of sufficient resiliency that when the weed deflecting member comes into contact with weeds, eel grass or the like it will tend to move the lure downwardly into the water to allow the weeds, eel grass, etc., to pass easily over the lure without engaging the barbed end of the hook. However, the ends of the strands 12 must be sufficiently pliable that they will part easily, if a fish should strike at the lure so that the fish will be securely hooked.

In order to give the body a life-like appearance, to protect it from vicarious handling and bumps and to render it water-tight so that it will always remain buoyant and not become waterlogged, a plastic coating 13 is provided which covers the entire body 1. This coating may be colored to simulate an animal such as a frog, or a mouse. Additional means such as simulated eyes 14 or spaced extension members 15 are also provided to complete the effect. It is understood that these members will all act to maintain the lateral stability of the body 1.

While the invention has been illustrated and described, it will be understood that the invention is not to be limited to the specific construction or arrangement of parts shown, but that they may be widely modified within the invention defined by the claims.

What is claimed is:

1. A fish lure for casting comprising a substantially streamlined body formed from a buoyant material, said body being symmetrical in plan view and unsymmetrical in side view, the upper surface forming a reverse curve along the central vertical plane with the rear portion curving concavely downwardly and of greater width than the forward portion, the lower surface of said body having an arcuate shape extending upwardly in the front third thereof to meet said upper surface, hook members extending rearwardly substantially continuous with said arcuate lower surface upwardly and over a portion of said upper surface, resilient weed deflecting means connected to said body on the upper surface at the point where said surface starts curving concavely downward and extending rearwardly over and about each of said hook members to conceal the barb portions thereof, and said body having a greater portion of the weight thereof disposed in the lower portion to allow said lure to assume an upright position when cast.

2. A fish lure for casting comprising a lifelike streamlined body formed from a buoyant material, said body being symmetrical in plan view and unsymmetrical in side view, the upper surface forming a reverse curve along the central vertical plane with the rear portion curving concavely downwardly and of greater width than the forward portion, the lower surface of said body being provided with a convex shape extending upwardly in the front of said body to meet the convex portion of the upper surface, the lateral surface on either side of said body being rounded to join said upper and lower surfaces, means continuous with said lateral and said lower surfaces to provide lateral stability to said body, at least one hook member projecting from the rear end portion of said body and extending upwardly and over the rear portion of the upper surface thereof and resilient weed deflecting means connected to said body on the concave portion of the upper surface and extending rearwardly over and about the hook member to conceal the barb portion thereof, said body having a greater portion of the weight thereof disposed in the lower portion to allow said lure to assume an upright position when cast.

3. In a fish lure as claimed in claim 1 wherein the means continuous with said lateral and said lower surfaces to lend lateral stability to said lure includes spaced extension members extending rearwardly from the body from the concave portion of the upper surface and to convex lower surface.

PETER PAUL CORSI.

REFERENCES CITED

The following references are of record in the file of this patent:

UNITED STATES PATENTS

| Number | Name | Date |
| --- | --- | --- |
| 295,369 | Dickinson | Mar. 18, 1884 |
| 1,522,450 | Hayes | Jan. 6, 1925 |
| 1,635,518 | Welch | July 12, 1927 |
| 1,653,400 | Jeffries | Dec. 20, 1927 |
| 1,663,080 | Heddon | Mar. 20, 1928 |
| 1,894,500 | Sweeney | Jan. 17, 1933 |
| 1,994,692 | Davenport | Mar. 19, 1935 |
| 2,219,225 | Gambill | Oct. 22, 1940 |
| 2,223,475 | Withey | Dec. 3, 1940 |
| 2,463,626 | Johnson | Mar. 8, 1949 |
| 2,483,245 | Steinhart | Sept. 27, 1949 |